Patented Jan. 16, 1934

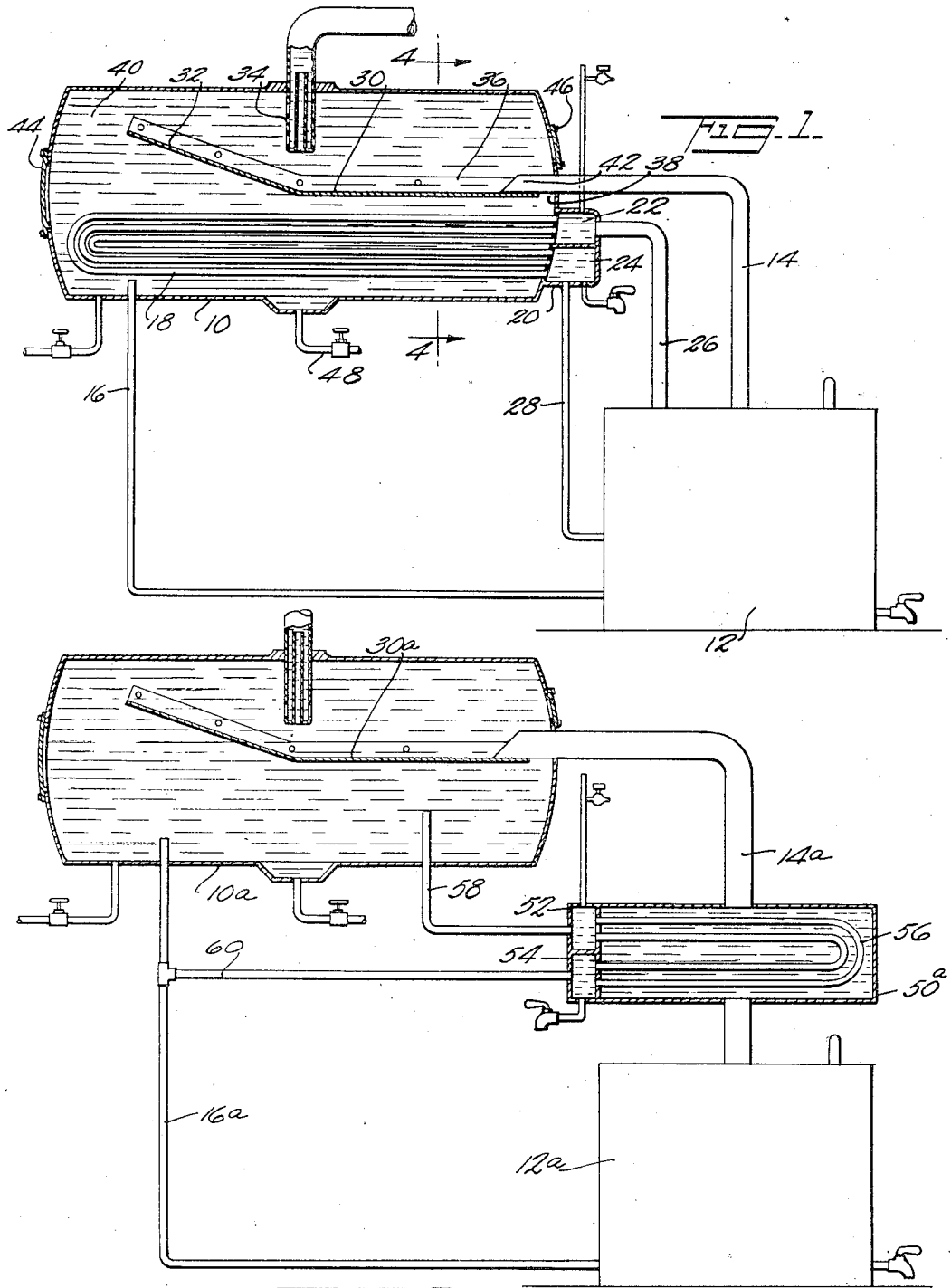

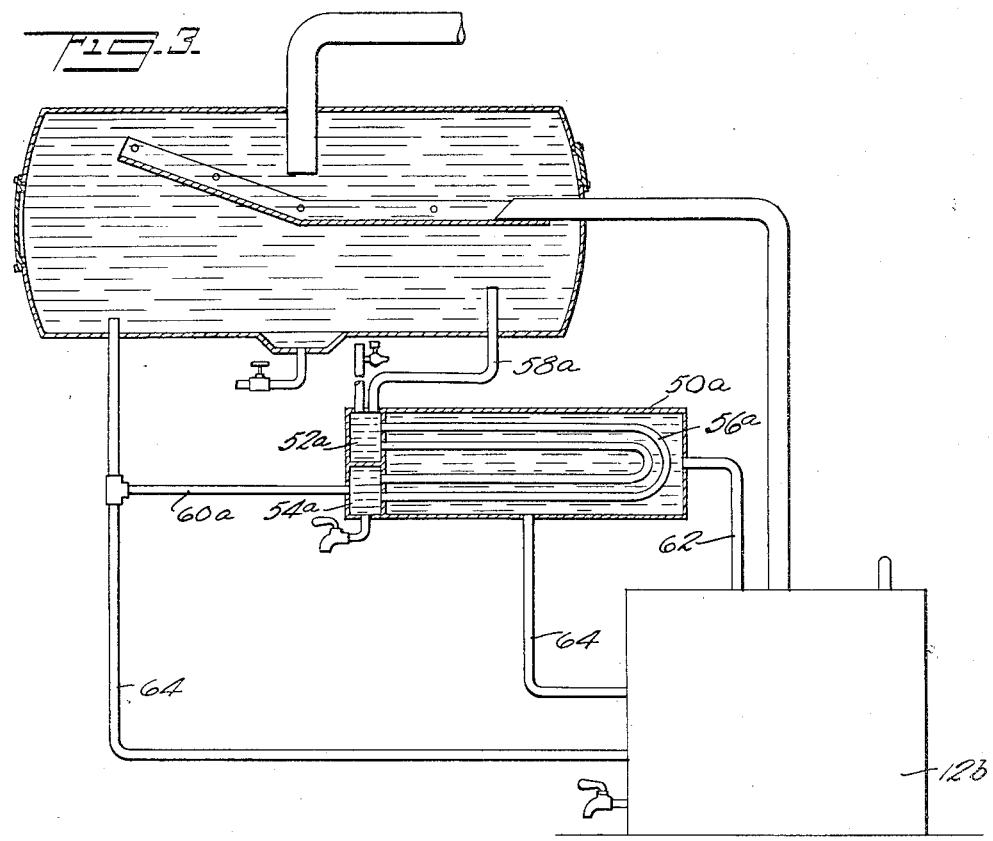
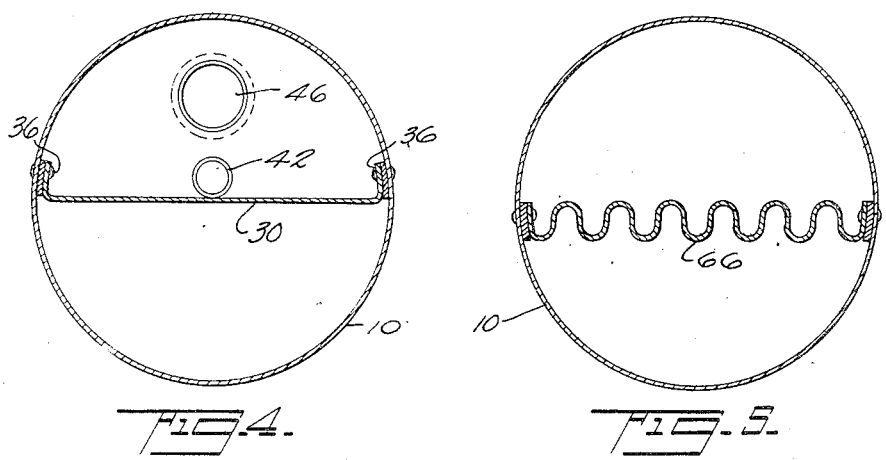

1,943,373

UNITED STATES PATENT OFFICE 1,943,373

DIRECT-INDIRECT WATER HEATING SYSTEM

Harry Del Mar, New York, N. Y.

Application April 1, 1933. Serial No. 663,904

4 Claims. (Cl. 122—33)

My invention relates to a water heating system in which water contained in a storage tank is heated both directly as by means of a direct inlet and return pipe connection between the water heater and the storage tank, and an indirect heating means for tempering the water in the lower part of the tank, in combination with a means for restricting the hotter water to close proximity with the supply outlet.

In the direct heating system, which is the system in common use, the lower water area of the storage tank is lower in temperature than the upper water area and it is one object of this invention to provide a heating means to raise the temperature of the water in this lower area.

In general the system comprises a hot water storage tank with a water heater connected directly to said tank in the usual manner, and an indirect heating means for heating the lower water area of the storage tank. The indirect heating means may comprise either a coil submerged in the lower water area of the storage tank, which coil is connected directly with the water heater, or may comprise a coil submerged in a water chamber located between the storage tank and the heater, the chamber being connected directly with the water heater, and the coil therein connected with the storage tank, whereby the lower water area of the storage tank is heated by the transfer of heat from the hot water passing through the coil in the first instance or by the transfer of heat from the hot water passing around the coil in the second instance. A baffle is also mounted within the storage tank to restrict the circulation of the water and to confine the hot water from the water heater in a section surrounding the general supply outlet.

In the drawings several arrangements are shown in which,

Fig. 1 is a section through a hot water storage tank with a water heater shown in elevation and connected with said tank, and an indirect heating coil submerged in said storage tank.

Fig. 2 is a view similar to Fig. 1 but showing the indirect heating coil submerged in a water chamber with said water chamber connected to the main hot water supply pipe.

Fig. 3 is a view showing an arrangement similar to Fig. 2 but with the water chamber connected directly to the water heater.

Fig. 4 is a section taken along the lines 4—4 of Fig. 1.

Fig. 5 is a view similar to Fig. 4 showing a modified form of baffle plate.

Referring to Fig. 1 of the drawings, the arrangement comprises a hot water storage tank 10 and a water heater 12, with a hot water feed line 14 joining said storage tank and heater, and a return water line 16 joined to said tank and heater in the usual manner. A pipe coil 18 is mounted in the lower portion of the storage tank with the ends of same joined to a header member 20, which header has an upper and lower compartment 22 and 24 respectively. A coil feed pipe 26 joins the upper header 22 with the water heater 12, and a coil water return feed pipe 28 joins the lower header compartment 24 with the water heater 12. By this arrangement it will be noted that the two methods are applied for heating the water in the storage tank 10, one by the direct method through the line 14 from the heater 12, and the other by the indirect method by the transfer of heat from the water passing through the coil 18 from the heater 12.

A baffle plate 30 is supported within the storage tank 10 and arranged so as to divide the upper half of the tank from the lower half and has one end 32 flared upward at an angle to direct the incoming flow of hot water from the heater 12 toward the outlet supply pipe 34. Said baffle may be secured to the tank 10 by riveting same along two upturned flanged edges 36—36, or in any other convenient manner. A space is left open at the ends of the baffle as indicated at 38 and 40 to allow the water to circulate through the whole tank. The inlet end 42 of the hot water feed pipe 14, projects into the tank 10 directly above the baffle 30, and the hot stream of water passing therethrough will pass over the surface of the baffle and be directed toward the outlet 34 before it circulates with the rest of the water in the tank. In this way the hottest part of the water is always in the vicinity of the outlet 34 and the hotter water area is confined above the baffle plate.

Since the circulation of the water within the tank is restricted, the water below the baffle would be cooler than it would ordinarily be without using the baffle plate, but by using a separate heating means, which can be heated from the same source of heat supply that heats the water above the baffle, the lower water area below the baffle can also be heated.

The storage tank is also provided with manhole and hand hole openings 44 and 46 and a blow off, to keep the inside of the tank clean. The required drain and vent connections are also provided as indicated.

In Fig. 2, a modified arrangement is shown for the indirect heating of the lower water area of the storage tank which comprises water chamber 50a interposed in the main hot water feed line 14a, and having an upper and lower header compartment 52—54 at one end thereof. A pipe coil 56, is suspended within said water chamber, the ends of which are connected to the headers 52—54 as shown, and two pipe connections 58—60 join the headers 52—54 with the storage tank 10a. Pipe connection 58 is the feed pipe which goes directly to the storage tank 10a and pipe 60 is the return pipe which is shown connected to the main return line 16a, but may be joined directly to the tank 10a if desired.

According to this arrangement, the hot water from the water heater 12a passes around the pipe coil 56 in the water chamber 50, then continues through the main feed pipe 14a to the storage tank 10a, discharging above the baffle 30a. The water which circulates through the pipe coil 56 from the storage tank 10a, is then heated by the transfer of heat from the hot water surrounding the coil and when heated circulates through the lower water area of the storage tank 10a.

Other details of the heater and tank construction are the same as shown in Fig. 1.

In Fig. 3, a further modification is shown which is similar in most respects to the arrangement shown in Fig. 2 but shows the water chamber 50a, as connected to the water heater 12b by two pipe connections, a feed pipe 62 and a return pipe 64.

The pipe coil 56a header compartments 52a—54a, and feed and return pipe connections 58a—60a are the same as those shown and described for Fig. 2. This arrangement also functions in the same manner as the arrangement shown in Fig. 2.

Referring to Fig. 5, the baffle 66 is shown corrugated for the purpose of exposing a greater surface area to the water at each side thereof, and thereby provide additional heat to the lower water area by the transfer of heat conducted by same.

Various changes can be made in the structure here shown and described as forming this invention, any such modifications still being within the scope of the invention here claimed, if the principles of construction and results above described are substantially preserved.

Having described my invention, I claim:

1. A water heating system comprising a storage tank and a heater, a pipe connection for the passage of hot water direct to said storage tank from said heater and a return line from the tank to said heater, in combination with an indirect heating means utilizing heat from the hot water of said heater to heat the lower water area of said tank.

2. A system as defined in claim 1 in which the indirect heating means comprises a coil suspended in the lower water area of the tank with the ends of said coil entering a divided header which provides a water inlet and outlet, a pipe connection for the passage of hot water from the heater to the inlet portion of said header, and a return line from the outlet portion of said header to the heater, whereby the passage of hot water from the heater passes through said coil causing the water in the lower water area of the tank to be heated.

3. A system as defined in claim 1 in which the indirect heating means comprises a water chamber interposed in the passages between the heater and tank, a coil suspended in said water chamber with the ends of said coil entering a two compartment header, forming a part of said chamber, and pipes connecting each of said header compartments with the lower water area of the storage tank, whereby the water in said tank circulates through said pipes and coil, and is heated while passing therethrough by the transfer of heat from the water surrounding the pipe coil.

4. A system as defined in claim 1 in which the indirect heating means comprises a water chamber, a coil suspended within said water chamber with the ends of said coil entering a two compartment header forming a part of said chamber, pipes connecting each of said header compartments with the lower water area of the storage tank, and a feed pipe line and a return pipe line connecting said water chamber with the heater, whereby the water in the coil is heated by the transfer of heat from the hot water surrounding same and passes into the lower water area of the storage tank.

HARRY DEL MAR.